United States Patent
Keene et al.

(10) Patent No.: US 11,837,703 B2
(45) Date of Patent: Dec. 5, 2023

(54) STATE-OF-HEALTH MODELS FOR LITHIUM-SILICON BATTERIES

(71) Applicant: ENEVATE CORPORATION, Irvine, CA (US)

(72) Inventors: Samuel Keene, Irvine, CA (US); Benjamin Yong Park, Mission Viejo, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

(21) Appl. No.: 17/548,845

(22) Filed: Dec. 13, 2021

(65) Prior Publication Data

US 2023/0187710 A1 Jun. 15, 2023

(51) Int. Cl.
*H01M 10/42* (2006.01)
*H01M 10/0525* (2010.01)

(52) U.S. Cl.
CPC ..... *H01M 10/425* (2013.01); *H01M 10/0525* (2013.01); *H01M 2010/4271* (2013.01); *H01M 2220/20* (2013.01)

(58) Field of Classification Search
CPC ........... H01M 10/425; H01M 2220/20; H01M 10/0525; H01M 2010/4271
USPC .......................................................... 429/90
See application file for complete search history.

(56) References Cited

U.S. PATENT DOCUMENTS

2015/0280290 A1* 10/2015 Saha .................... H01M 10/425
324/426
2018/0287219 A1* 10/2018 Sood ....................... G01N 29/26

OTHER PUBLICATIONS

Mawonou et al. State-of-health estimators coupled to a random forest approach for lithium-ion battery aging factor ranking. Apr. 21, 2020. Journal of Power Sources (Year: 2020).*
Jichao Hong, et al., "Online accurate state of health estimation for battery systems on real-world electric vehicles with variable driving conditions considered", Journal of Cleaner Production, Jan. 6, 2021, 16 pages.
Xiong Feng, et al., "State-of-charge estimation of lithium-ion battery based on clockwork recurrent neural network", Energy, Jul. 3, 2021, 10 pages.
Yihuan Li, et al., "Lithium-ion battery capacity estimation—A pruned convolutional neural network approach assisted with transfer learning", Applied Energy, Jan. 4, 2021, 13 pages.

(Continued)

*Primary Examiner* — Gary D Harris
(74) *Attorney, Agent, or Firm* — McAndrews, Held & Malloy, Ltd.

(57) ABSTRACT

Systems and methods are provided for state-of-health models for lithium-silicon batteries. State-of-health (SOH) of a lithium-ion cell may be assessed, with the assessing including calculating the state-of-health (SOH) using an enhanced state-of-health (SOH) model, with the enhanced state-of-health (SOH) model using input data other than data provided directly by the lithium-ion cell. The input data includes at least data acquired during operation of the lithium-ion cell and/or data acquired during manufacturing and initialization of the lithium-ion cell or electrodes of the lithium-ion cell. The lithium-ion cell may be a silicon-dominant cell including a silicon-dominant anode with silicon >50% of active material of the anode, and the enhanced state-of-health (SOH) model may be configured based on one or more characteristics unique to silicon-dominant cells.

20 Claims, 7 Drawing Sheets

(56) References Cited

OTHER PUBLICATIONS

Kodjo S.R. Mawonou, Akram Eddahech, Didier Dumur, Dominique Beauvois, Emmanuel Godoy. "State-of-health estimators coupled to a random forest approach for lithium-ion battery aging factor ranking", Journal of Power Sources, Elsevier, Jan. 10, 2021, 28 pages.

* cited by examiner

FIG. 6

STATE-OF-HEALTH MODELS FOR LITHIUM-SILICON BATTERIES

CROSS-REFERENCE TO RELATED APPLICATIONS/INCORPORATION BY REFERENCE

This patent application also makes reference to:
U.S. patent application Ser. No. 17/548,830, filed on even date herewith; and
U.S. patent application Ser. No. 17/548,851, filed on even date herewith.
Each of the above identified applications is hereby incorporated herein by reference in its entirety.

TECHNICAL FIELD

Aspects of the present disclosure relate to energy generation and storage. More specifically, certain implementations of the present disclosure relate to methods and systems for state-of-health models for lithium-silicon batteries.

BACKGROUND

Various issues may exist with conventional battery technologies. In this regard, conventional systems and methods, if any existed, for designing and producing batteries or components thereof may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for state-of-health models for lithium-silicon batteries, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1A:
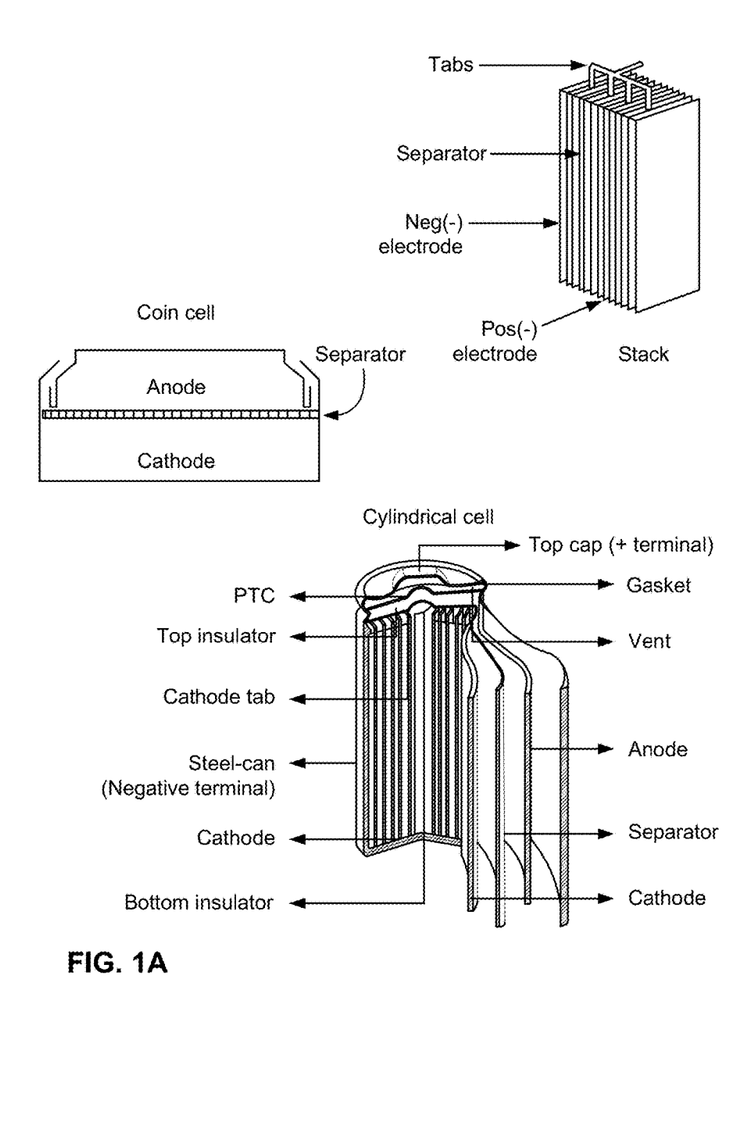
FIG. 1A is a block diagram of an example battery.

FIG. 1A is a diagram of an example battery. Referring to FIG. 1A, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1A is a very simplified example merely to show the principle of operation of a lithium ion cell. Examples of realistic structures are shown to the right in FIG. 1A, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode 105 are electrically coupled to the current collectors 107A and 107B, which comprise metal or other conductive material for providing electrical contact to the electrodes as well as physical support for the active material in forming electrodes.

The configuration shown in FIG. 1A illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. In this regard, different methods or processes may be used in forming electrodes, particularly silicon-dominant anodes. For example, lamination or direct coating may be used in forming a silicon anode. Examples of such processes are illustrated in and described with respect to FIGS. 2 and 3. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. In an example scenario, the electrolyte may comprise Lithium hexafluorophosphate ($LiPF_6$) and lithium bis(trifluoromethanesulfonyl)imide (LiTFSI) that may be used together in a variety of electrolyte solvents. Lithium hexafluorophosphate ($LiPF_6$) may be present at a concentration of about 0.1 to 2.0 molar (M) and lithium bis(trifluoromethanesulfonyl)imide (LiTFSI) may be present at a concentration of about 0 to 2.0 molar (M). Solvents may comprise one or more of ethylene carbonate (EC), fluoroethylene carbonate (FEC) and/or ethyl methyl carbonate (EMC) in various percentages. In some embodiments, the electrolyte solvents may comprise one or more of EC from about 0-40%, FEC from about 2-40% and/or EMC from about 50-70% by weight.

The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon or more by weight in the anode material on the current collector, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1A for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (Super P), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge as well as provide additional mechanical robustness to the electrode and provide mechanical strength (e.g., to keep the electrode material in place). Graphenes and carbon nanotubes may be used because they may show similar benefits. Thus, in some instances, a mixture of two or more of carbon black, vapor grown carbon fibers, graphene, and carbon nanotubes may be used as such mixtures or combinations may be especially beneficial.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

In some embodiments, dedicated systems and/or software may be used for control and managing batteries or packs thereof. In this regard, the software may run on suitable circuitry, such as on processing circuitry (e.g., general processing units) already present in in the systems or it may be implemented on dedicated hardware. For example, battery packs (e.g., those used in electric vehicles) may be equipped with a battery management system (BMS) for managing the batteries (or packs) and operations. An example battery management system (BMS) is illustrated in and described in more detail with respect to FIG. 1B.

In accordance with the present disclosure, control and management of batteries, particularly lithium-ion batteries with silicon-dominant anodes (also referred to herein as "Si/Li batteries"), and operation thereof may be improved by use of enhanced state-of-health (SOH) models. In this regard, SOH models may be key components of battery control and management systems, such as the BMS illustrated in FIG. 1B. Such SOH models may be defined or configured (e.g., by users, battery designers/makers, etc.) for assessing state-of-health of a battery (or pack of batteries) based on one or more specific considerations or metrics, such as, for example, remaining useful life, possibility or closeness to failure, etc.

Conventional SOH models may have some limitations and/or shortcomings, however. In this regard, SOH models use data relating to the battery and its operation as measured or obtained by the BMS. The data is not limited to a particular type, and it may comprise any data that may be probative or indicative of health of the battery. In conventional solutions, however, data used by the SOH models is limited to data received from or provided directly by the battery (or battery pack) itself. However, a battery's state-of-health (or more accurately assessment thereof) may require more data than is available in the battery itself. In other words, data typically available to and used in conventional SOH models may not be adequate for some types of batteries. Further, data typically available to and used in conventional SOH models may not be very reliable for particular types of batteries. This may especially be the case with Si/Li batteries. In this regard, conventional SOH models may particularly have some limitations and/or shortcomings with respect to Si/Li batteries. In this regard, conventional SOH models for estimation of SOH are typically designed and configured for conventional Li-ion batteries that typically contain graphite anodes (>50% graphite as the active material). The operation, degradation, and sudden failure modes of graphite anode based Li-ion batteries are different from those of Si/Li batteries—that is, batteries with anodes that are silicon-dominant (>50% silicon as the active material), and conventional SOH models may not be capable of accurately predicting the SOH of these Li/Si batteries.

The shortcomings of conventional SOH models may be due to various reasons, including, for example: 1) conventional SOH models assume a state-of-charge (SOC) vs. voltage relationship that does not contain substantial hysteresis, whereas Si/Li batteries have SOC vs. voltage relationships that contain hysteresis under operating conditions; 2) conventional SOH models assuming a strong correlation between direct current internal resistance (DCIR) and the SOH of the battery, whereas Si/Li batteries may have more complex (nonlinear) relationships between DCIR and SOH; and 3) the dependence of battery degradation on operating temperature, charge/discharge rate and operating voltage being fundamentally different for Si/Li batteries and other batteries, as is the relationship between total cycled capacity and SOH.

Enhanced SOH models in accordance with the present disclosure overcome and resolve at least some of the limitations or shortcomings of conventional solutions. In this regard, enhanced SOH models based on the present disclosure may incorporate measures for obtaining, determining, and/or using data from other sources— that is, in lieu of and/or in addition to data obtained directly from the battery (or pack of batteries) itself. The enhanced SOH models may incorporate use of intelligent and/or advanced processing techniques (e.g. machine learning or the like) for optimizing SOH assessment, particularly based on the additional data input to the SOH models. Further, as implemented, the SOH models may be uniquely configured for particularly types of batteries, such as Si/Li batteries. In this regard, the enhanced SOH models may be configured to account for unique characteristics or attributes of such batteries and operation thereof. The enhanced SOH models, and example embodiments based thereon, are described in more detail below.

Figure 1B:
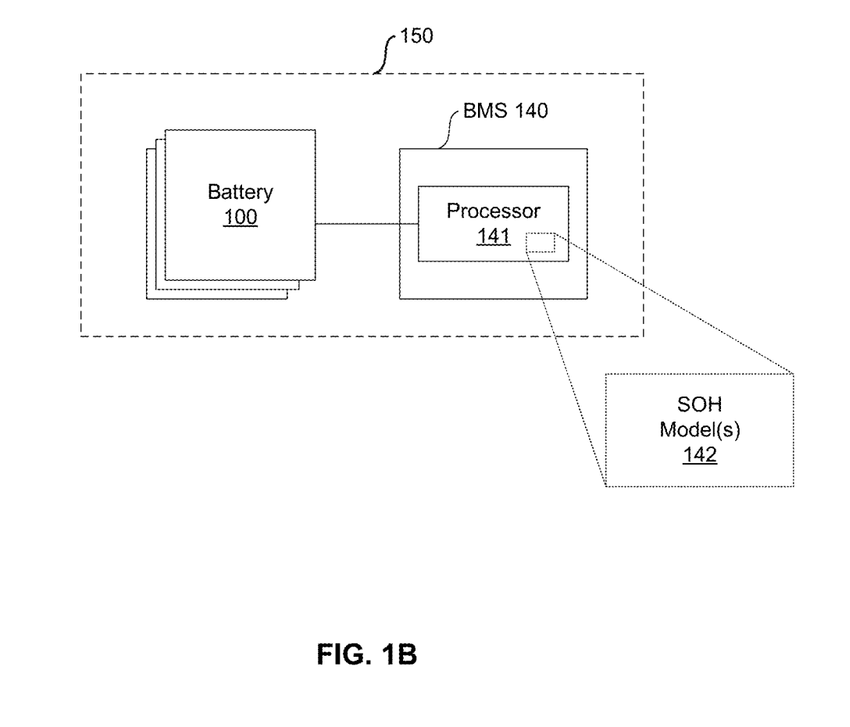
FIG. 1B is a block diagram of an example battery management system (BMS) for use in managing operation of batteries.

FIG. 1B illustrate an example battery management system (BMS) for use in managing operation of batteries. Shown in FIG. 1B is battery management system (BMS) 140.

The battery management system (BMS) 140 may comprise suitable circuitry (e.g., processor 141) configured to manage one or more batteries (e.g., each being an instance of the battery 100 as described with respect with FIG. 1A). In this regard, the BMS 140 may be in communication and/or coupled with each battery 100.

In some embodiments, the battery 100 and the BMS 140 may be in communication and/or coupled with each other, for example, via electronics or wireless communication. In some embodiments, the BMS 140 may be incorporated into the battery 100. Alternatively, in some embodiments, the BMS 140 and the battery 100 may be combined into a common package 150. Further, in some embodiments, the BMS 140 and the battery 100 may be separate devices/components, and may only be in communication with one another when present in the same system. The disclosure is not limited to any particular arrangement, however.

In accordance with the present disclosure, control and management of batteries, particularly lithium-ion batteries with silicon-dominant anodes (also referred to herein as "Si/Li batteries"), and operation thereof may be improved by use of enhanced state-of-health (SOH) models. In this regard, SOH models may be key components of battery control and management systems, such as the battery management system (BMS) 140 of FIG. 1B. However, as described above, conventional SOH models may have some limitations and/or shortcomings, however. In contrast, enhanced SOH models in accordance with the present disclosure overcome some of the limitations and shortcomings of conventional models, particularly with respect to improving the estimation of silicon-dominant anode based Si/Li batteries. Nonetheless, such enhanced SOH models may also yield improved performance when used with other types of batteries, including graphite-dominant anode based batteries. For example, the BMS 140 may incorporate an enhanced SOH model 142, which may be configured to remedy at least some of the shortcomings or limitations of conventional models. The SOH model 142 may be implemented in the processor 141. In this regard, the SOH model 142 may be generated, maintained, and/or updated by the processor 141, and may be used in conjunction with the management of the battery 100.

In some embodiments, enhanced SOH models (e.g., the SOH model 142 of FIG. 1B) may be used that calculates SOH of batteries, using data acquired during the operation of the battery as well as other data, such as data acquired during manufacturing and initialization of the electrodes and cells (e.g., formation, electrode quality control (QC), material incoming QC, cell outgoing QC, aging data, etc.) as input. The batteries may be silicon-dominant (e.g., >50% active material) Si/Li batteries, but the disclosure is not limited to such batteries, and as such enhanced SOH models (e.g., the SOH model 142 of FIG. 1B) as described herein may also be used with other types of batteries, where use of such additional data may allow for enhanced performance.

In some embodiments, the enhanced SOH models (e.g., the SOH model 142 of FIG. 1B) may be configured for use regardless of the operation mode of batteries, and may be more accurate in all use cases compared to conventional SOH models that are dependent on simple measurements made within and provided from the batteries (or packaging thereof), such as voltage, open circuit voltage (OCV), or impedance (e.g., measured with a pulse or otherwise).

In some embodiments, the enhanced SOH models (e.g., the SOH model 142 of FIG. 1B) may be configured to support and incorporate use of data obtained or generated from or based on formation of the batteries (e.g., at the factory). This may comprise, for example, data relating to the first charge and other procedures used to initialize the cell.

In some embodiments, the enhanced SOH models (e.g., the SOH model 142 of FIG. 1B) may be configured to support and incorporate use of data from quality measurements of cells and/or materials at the factory, including before and during fabrication.

In some embodiments, the enhanced SOH models (e.g., the SOH model 142 of FIG. 1B) may be configured to support and incorporate use of historical data of the battery (e.g., historical time series of battery's voltage, current, and temperature) as additional inputs.

In some embodiments, the enhanced SOH models (e.g., the SOH model 142 of FIG. 1B) may be configured to support and incorporate use of data features calculated from raw time series data. Such time series data may comprise, but is not limited to cumulative capacity, cumulative energy, average rate, average temperature, maximum rate, minimum temperature, maximum temperature, cumulative capacity and/or energy binned by voltage, cumulative capacity and/or energy binned by rate, cumulative capacity and/or energy binned by temperature, statistical comparisons of voltage profiles throughout the life of the battery, curve fits or other quantitative calculations based on portions of voltage profiles, quantitative calculations based on the differential of the voltage curve, for instance, $dV/dt$, $dV/dQ$, $dQ/dV$, etc., calculations based on small portions of time series data that meets a specific criterion, for instance, voltage changes when the state of the battery changes from open circuit (i.e., no current applied) to a state with current applied, and any mathematical combination of the previously described features.

In some embodiments, the enhanced SOH models (e.g., the SOH model 142 of FIG. 1B) may be configured to support and incorporate use of data from particular prescribed measurement sequences. An example prescribed measurement sequences may comprise, but not limited to current pulse, open circuit voltage measurement, battery reference performance test, hybrid pulse power characterization test, and direct current internal resistance (DCIR) measurement.

In some embodiments, the enhanced SOH models (e.g., the SOH model 142 of FIG. 1B) may be trained using enhanced processing techniques, such as machine learning (ML) algorithms. Such machine learning (ML) algorithms may comprise, but are not limited to linear regression, logistic regression, nonlinear regression, decision tree ensemble methods (such as gradient boosting or random forests), neural networks, recurrent neural networks such as long-short-term memory networks, Gaussian process algorithms, Bayesian algorithms, support vector regression, K-nearest-neighbors regression, and graph neutral networks.

In some embodiments, the enhanced SOH models may be trained using training data, which may be used, e.g., in conjunction with the machine learning (ML) algorithms. The training data may be generated, such as by operating a collection of batteries using voltage, current, and temperature profiles that are randomized. The training data may also be generated by using a standardized drive-cycle test (e.g., the Federal Urban Driving Schedule (FUDS) test).

In some embodiments, the enhanced SOH models (e.g., the SOH model 142 of FIG. 1B) may be generated or configured based on physical phenomena.

In some embodiments, the enhanced SOH models (e.g., the SOH model 142 of FIG. 1B) may be generated as a combination of models based on any of the other implementation described herein.

In some embodiments, an algorithm that utilizes enhanced SOH model(s) generated or configured as described herein may be used to adjust the operating parameters of batteries, such as to prolong useful life of the batteries. The adjustments effectuated by the algorithm may comprise, but are not limited to changes to maximum and minimum voltage, changes to maximum rate, and changes to maximum and minimum temperature.

In some embodiments, improvement in performance may comprise cycle fade improvement. In some instances, the cycle fade improvement from use of the enhanced SOH models (e.g., the SOH model 142 of FIG. 1B) may be by more than 15%.

In some embodiments, a battery (or pack of batteries) utilizing or supporting the enhanced SOH models may be incorporated into an electric vehicle, to facilitate use of such SOH information provided by such models to ensure more accurate gauging of state-of-health of the batteries. Use of such battery (or pack of batteries) may ensure improve cycle fade.

Figure 2:
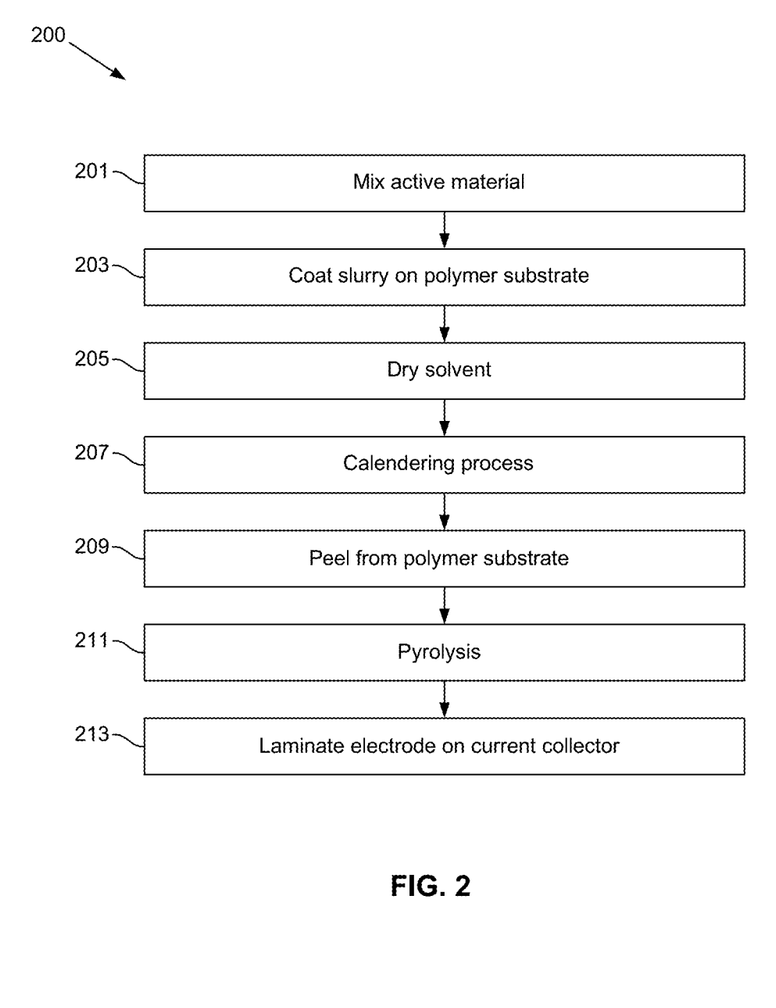
FIG. 2 is a flow diagram of an example lamination process for forming a silicon anode.

FIG. 2 is a flow diagram of an example lamination process for forming a silicon anode. Shown in FIG. 2 is flow chart 200, comprising a plurality of example steps (represented as blocks 201-213) for an example lamination process. In this regard, this process employs a high-temperature pyrolysis process on a substrate, layer removal, and a lamination process to adhere the active material layer to a current collector.

The raw electrode active material is mixed in step 201. In the mixing process, the active material may be mixed, e.g., a binder/resin (such as PI, PAI), solvent (e.g., as organic or aqueous), and conductive additives. The materials may comprise carbon nanotubes/fibers, graphene sheets, graphene oxide, metal polymers, metals, semiconductors, and/or metal oxides, for example. The additives may comprise 1D filaments with one dimension at least 4×, at least 10×, or at least 20× that of the other two dimensions, 2D sheets or mesh with two dimensions at least 4×, at least 10×, or at least 20× that of the other dimension, or 3D structures with one dimension at least 20×, at least 10×, or at least 4× that of the other two, where none of the dimensions are of nanoscale size. Silicon powder with a 1-30 or 5-30 μm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

In step 203, the slurry may be coated on a substrate. In this step, the slurry may be coated onto a Polyester, polyethylene terephthalate (PET), or Mylar film at a loading of, e.g., 2-4 mg/cm$^2$ and then in step 205 undergo drying to an anode coupon with high Si content and less than 15% residual solvent content. This may be followed by an optional calendering process in step 207, where a series of hard pressure rollers may be used to finish the film/substrate into a smoothed and denser sheet of material.

In step 209, the green film may then be removed from the PET, where the active material may be peeled off the polymer substrate, the peeling process being optional for a polypropylene (PP) substrate, since PP can leave ~2% char residue upon pyrolysis. The peeling may be followed by a pyrolysis step 211 where the material may be heated to >900° C. but less than 1250° C. for 1-3 hours, cut into sheets, and vacuum dried using a two-stage process (120° C. for 15 h, 220° C. for 5 h). The dry film may be thermally treated at, e.g., 1100-1200° C. to convert the polymer matrix into carbon.

In step 213 the electrode material may be laminated on a current collector. For example, a 5-20 μm thick copper foil may be coated with polyamide-imide with a nominal loading of, e.g., 0.2-0.6 mg/cm$^2$ (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

The process described above is one example process that represents a composite with fabrication steps including pyrolysis and lamination. Another example scenario comprises a direct coating process in which an anode slurry is directly coated on a copper foil using a binder such as CMC, SBR, Sodium Alginate, PAI, PI, PAA, and mixtures and combinations thereof. The process in this example comprises: direct coat active material on a current collector, dry, calendering, heat treatment.

In a direct coating process, an anode slurry is coated on a current collector with residual solvent followed by a calendaring process for densification followed by pyrolysis (~500-800° C.) such that carbon precursors are partially or completely converted into pyrolytic carbon. Pyrolysis can be done either in roll form or after punching. If done in roll form, the punching is done after the pyrolysis process.

In another example of a direct coating process, an anode slurry may be coated on a current collector with low residual solvent followed by a calendaring process for densification followed by removal of residual solvent.

Figure 3:
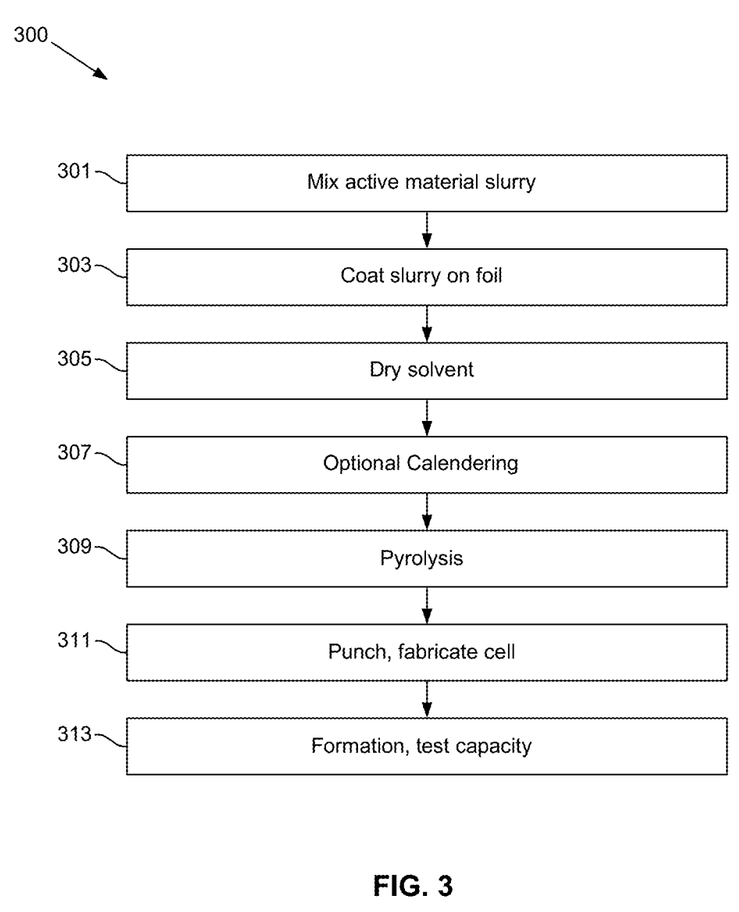
FIG. 3 is a flow diagram of an example direct coating process for forming a silicon anode.

In an example scenario, the conductive structural additives, which may be added in step 201 in FIG. 2 or step 301 in FIG. 3, may comprise between 1 and 40% by weight of the anode composition, with between 50% and 99% silicon by weight. The fibrous (1 D) particles may have an aspect ratio of at least 4, but may be higher than 10, higher than 20, or higher than 40, for example, and may comprise a tubular or fiber-like conductive structure with nanoscale size in two-dimensions, where carbon-based examples comprise carbon nanotubes, carbon nanofibers (CNF), and vapor grown carbon fibers (VGCP). Other fibrous structures are possible, such as metals, metal polymers, metal oxides The 2D carbon structures may have an average dimension in the micron scale in each of the two non-nanoscale dimensions that is at least 4× that in the thickness direction, for example, and may be at least 20× larger, or at least 40× larger in the lateral directions as compared to the thickness direction. Graphene sheets are an example of conductive carbon additives, while other 2D structures are possible, such as "wire" meshes of metal or metal polymers, for example.

Furthermore, the active material may comprise 3D conductive structural additives, where the material is not limited to nanoscale in any one dimension. In a 3D additive example, one dimension of the structure may be at least 4×, at least 10×, or at least 20× that of the other two dimensions, where none of the dimensions are of nanoscale size. Examples of 3D conductive structural additives may be "chunks" of carbon, metal, metal polymer, or semiconductors.

In another example scenario, the anode active material layer fabricated with the carbon additive described above may comprise 20 to 95% silicon and in yet another example scenario may comprise 50 to 95% silicon by weight.

FIG. 3 is a flow diagram of an example direct coating process for forming a silicon anode. Shown in FIG. 3 is flow chart 300, comprising a plurality of example steps (represented as blocks 301-313) for an example direct coating process. In this regard, this process comprises physically mixing the active material, conductive additive, and binder together, and coating it directly on a current collector. This example process comprises a direct coating process in which an anode or cathode slurry is directly coated on a copper foil using a binder such as CMC, SBR, Sodium Alginate, PAI, PI, PAA, and mixtures and combinations thereof.

In step 301, the active material may be mixed, e.g., a binder/resin (such as PI, PAI), solvent, and conductive and structural additive. For example, the additives may comprise conductive materials that also provide structural continuity between cracks in the anode following multiple cycles. The materials may comprise carbon nanotubes/fibers, graphene sheets, metal polymers, metals, semiconductors, and/or metal oxides, metal/carbon nanofiber or metal/carbon nanotube composites, carbon nanowire bundles, for example. Silicon powder with a 5-30 μm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

Furthermore, cathode active materials may be mixed in step 301, where the active material may comprise lithium cobalt oxide (LCO), lithium manganese oxide (LMO), lithium iron phosphate (LFP), lithium nickel cobalt manganese oxide (NMC), lithium nickel cobalt aluminum oxide (NCA), nickel, cobalt, manganese and aluminum (NCMA), lithium nickel manganese spinel, or similar materials or combinations thereof, mixed with a binder as described above for the anode active material.

In step 303, the slurry may be coated on a copper foil. Similarly, cathode active materials may be coated on a foil material, such as aluminum, for example. The active material layer may undergo a drying in step 305 resulting in reduced residual solvent content. An optional calendering process may be utilized in step 307 where a series of hard pressure rollers may be used to finish the film/substrate into a smoother and denser sheet of material. In step 307, the foil and coating proceeds through a roll press for lamination.

In step 309, the active material may be pyrolyzed by heating to 500-1000° C. such that carbon precursors are partially or completely converted into glassy carbon. The pyrolysis step may result in an anode active material having silicon content greater than or equal to 50% by weight, where the anode has been subjected to heating at or above 400° C.

Pyrolysis can be done either in roll form or after punching in step 311. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In some instances, separator with significant adhesive properties, in accordance with the present disclosure, maybe utilized.

In step 313, the cell may be subjected to a formation process, comprising initial charge and discharge steps to lithiate the anode, with some residual lithium remaining, and the cell capacity may be assessed.

Figure 4:
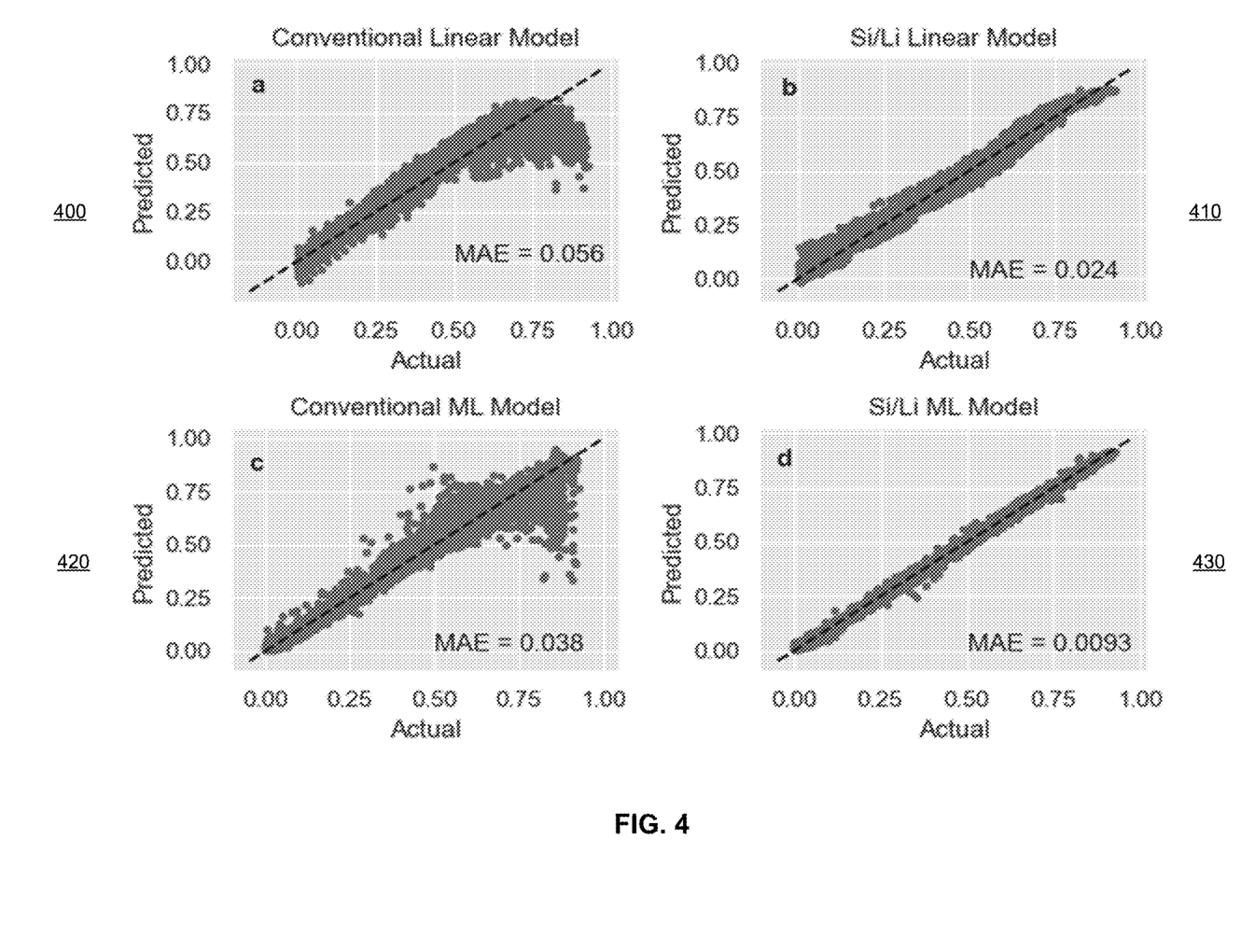
FIG. 4 is a plot diagram illustrating comparisons between conventional models and models in accordance with the present disclosure.

FIG. 4 is a plot diagram illustrating comparisons between conventional models and models in accordance with the present disclosure. Shown in FIG. 4 are graphs 400, 410, 420 and 430.

Illustrated in FIG. 4 is comparison of performance between models using conventional solutions (graphs 400 and 420) and the solutions described in the present disclosure (410 and 430). In this regard, graphs 400, 410, 420 and 430 illustrate initial discharge capacity versus standardized capacity (predicted and measured) for performance comparison between conventional models—that is, models built using conventional Li-ion battery SOH model features, and enhanced state-of-health (SOH) models as described in the present disclosure. In particular, as explained above, in conventional models only data conventionally available to BMS (from the battery package) are used as input, whereas with the enhanced SOH models data from other sources (e.g., from the factory/during manufacturing, physical knowledge of the system, data describing particular phenomena associated with the Si/Li batteries, etc.) may also be used as input.

In graphs 400, 410, 420 and 430, the predicted SOH is plotted against the actual SOH for a series of Li/Si batteries subjected to charge/discharge cycling with randomized rates and cutoff voltages. In other words, in each of graphs 400, 410, 420 and 430, the y-axis is the predicted SOH values whereas the x-axis is the actual SOH values, with SOH values corresponding to individual SOH measurements of battery with cycle history. The mean absolute error (MAE) is reported on each plot.

In graphs 400 and 420, the input features to the model are midpoint voltage, open-circuit voltage, and resistance measured during a reference performance test cycle. In graphs 410 and 430, the input features are calculated values extracted from the voltage and current vs. time data collected during testing. These features do not depend on the operation mode of the battery, and do not require a reference performance test or other standardized measurement. In graphs 400 and 410, the model is trained using linear regression. In graphs 420 and 430, the model is trained using an advanced machine learning (ML) algorithm (e.g., XGBoost framework, a gradient boosting decision tree algorithm, etc.). Graph 430 illustrates an example of the optimal operation in accordance with the present disclosure, achieving a mean absolute error of less than 1%. Both the training algorithm used and the data features used as input contribute to the model's superior performance vs. conventional methods.

As illustrated in FIG. 4, even when a more sophisticated ML algorithm is used for training on conventional data (graphs 420 and 430), the model in accordance with the present disclosure has superior performance, regardless of training algorithm. The combination of a ML algorithm and the data features described in accordance with the present disclosure yield the best performance.

Figure 5:
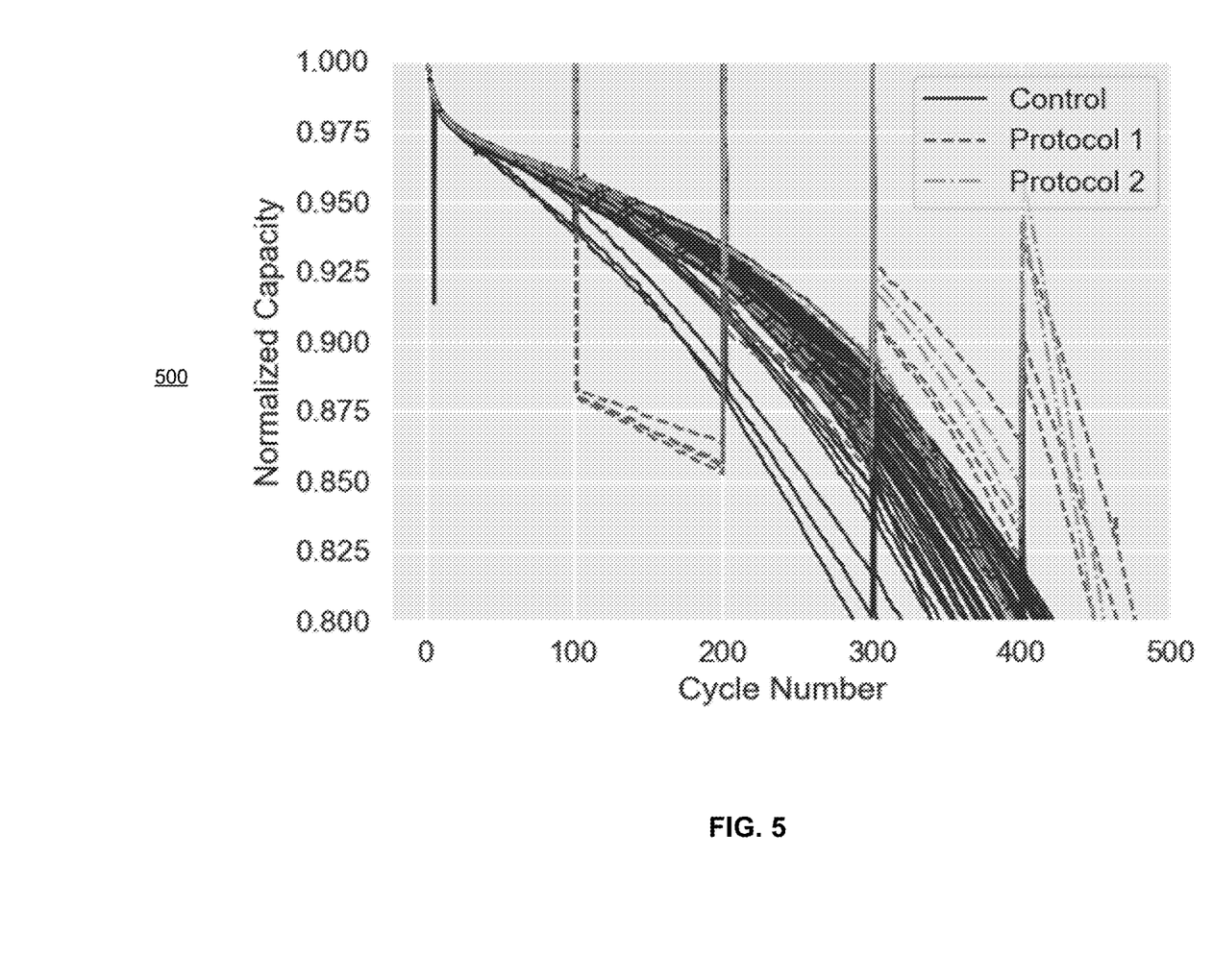
FIG. 5 is a plot diagram illustrating normalized capacity as a function of cycle number for different protocols based on use of an algorithm for modifying the operating voltage.

FIG. 5 is a plot diagram illustrating normalized capacity as a function of cycle number for different protocols based on use of an algorithm for modifying the operating voltage. Shown in FIG. 5 is graph 500.

Illustrated in graph 500 is normalized discharge capacity as a function of cycle number for a set of batteries, particularly Si/Li batteries as described herein. In other words, in graph 500, the y-axis is the normalized discharge capacity values whereas the x-axis is number of cycles. In the example use scenario(s) represented in graph 500, an algorithm is used to optimize a cycling protocol where the operating voltage is changed every 100 cycles. In particular, the algorithm controls the minimum voltage to be the highest possible value that keeps the capacity over particular value relative to the initial capacity (e.g., 80% initial capacity). In other words, 80% initial capacity corresponds to end of life capacity. As noted above, such algorithm may be used in conjunction with enhanced state-of-health (SOH) models, as described above. The use of the algorithm may result in improvement in cycle life of the batteries. Use of such algorithms is described in more detail in incorporated U.S. patent application Ser. No. 17/548,830.

As shown in FIG. 5, graph 500 captures data corresponding to two protocols where the algorithm has been used to modify the operating voltage of a set of batteries, compared to a control group where no modification is made. In particular, in the protocol labeled "protocol 1", the algorithm may be allowed to set the minimum voltage to a value higher than the initial minimum voltage, whereas in the protocol labeled "protocol 2", the algorithm is constrained to keep the minimum voltage equal to or lower than the initial minimum voltage. In both cases, the algorithm-based protocols have higher cycle life and cumulative discharge capacity than the control group. As illustrated in graph 500, in the example use cases captured in graph 500, the batteries may achieve an average improvement in cycle life of 17% (cycles to 80% initial capacity).

Figure 6:
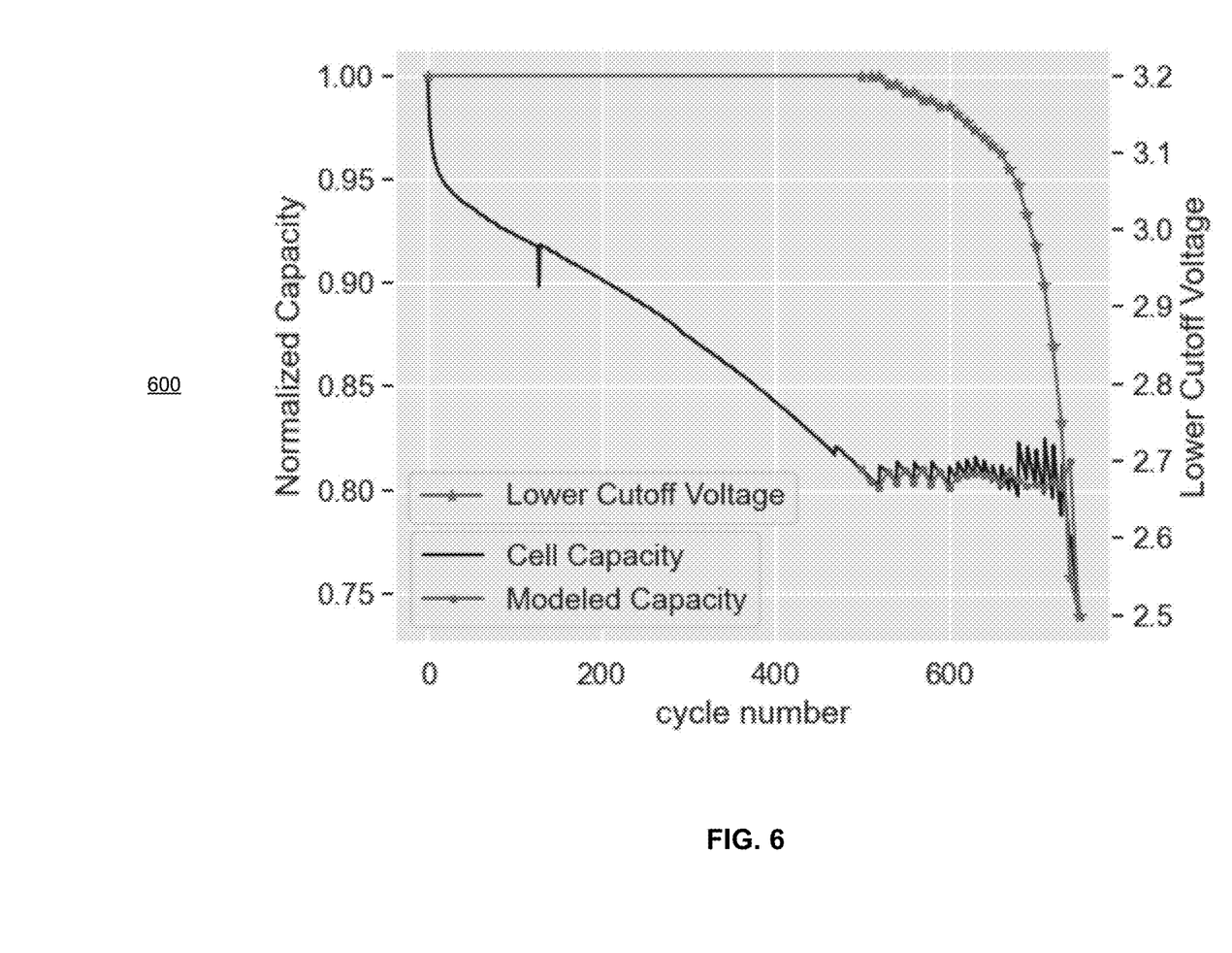
FIG. 6 is a plot diagram illustrating normalized capacity as a function of cycle number for a cell where the operating voltage is adjusted periodically based on the output of a state-of-health (SOH) model.

FIG. 6 is a plot diagram illustrating normalized capacity as a function of cycle number for a cell where the operating voltage is adjusted periodically based on the output of an SOH model. Shown in FIG. 6 is graph 600.

Illustrated in graph 600 is normalized discharge capacity as a function of cycle number for a set of batteries, particularly Si/Li batteries as described herein. In other words, in graph 600, the y-axis is the normalized discharge capacity values whereas the x-axis is number of cycles. In the example use scenario(s) represented in graph 600, an algorithm is used to modify the operating voltage every ten cycles. In particular, the algorithm controls the minimum voltage to be the highest possible value that keeps the capacity over particular value relative to the initial capacity (e.g., 80% initial capacity) with the constraint that the minimum cell voltage cannot be higher than the initial minimum cell voltage. In other words, 80% initial capacity corresponds to end of life capacity. The algorithm uses the state-of-health predicted by an enhanced state-of-health (SOH) model to determine the optimal operating voltage at each 10 cycle interval. The use of the algorithm may result in improvement in cycle life of the batteries. Use of such algorithms is described in more detail in incorporated U.S. patent application Ser. No. 17/548,830.

As shown in FIG. 6, graph 600 captures data corresponding to the cycling of a cell where the algorithm has been used to modify the operating voltage. The solid trace with no markers, labeled "Cell Capacity" and corresponding to the left y-axis, is the measured normalized capacity of the cell. The solid trace with circular markers, labeled "Modeled Capacity" and corresponding to the left y-axis, is the capacity determined by the SOH model. The solid trace with star markers, labeled "Lower Cutoff Voltage" and corresponding to the right y-axis, is the minimum voltage of the cell at each 10 cycle increment. The minimum voltage value is constant throughout each 10 cycle increment; the line in the plot is a guide for the eye. At cycle 530, the algorithm makes the first changes to the operating voltage of the cell. This point represents the cycles to 80% initial capacity of the cell under normal operating conditions. Thus, the use of the algorithm allows substantial improvement in the cycle life of the cell. As illustrated in graph 600, in the example use cases captured in graph 600, the cell may achieve an improvement in cycle life of 32% (cycles to 80% initial capacity).

An example method for managing a lithium-ion cell, in accordance with the present disclosure, comprises: assessing state-of-health (SOH) of the lithium-ion cell, wherein: the assessing comprises calculating the state-of-health (SOH) using an enhanced state-of-health (SOH) model, with the enhanced state-of-health (SOH) model using input data other than data provided directly by the lithium-ion cell, where the input data comprises at least data acquired during operation of the lithium-ion cell and/or data acquired during manufacturing and initialization of the lithium-ion cell or electrodes of the lithium-ion cell.

In an example implementation, the lithium-ion cell comprises a silicon-dominant cell comprising a silicon-dominant anode with silicon >50% of active material of the anode, and the enhanced state-of-health (SOH) model is configured based on one or more characteristics unique to silicon-dominant cells.

In an example implementation, the enhanced state-of-health (SOH) model is configured for use regardless of an operation mode of the lithium-ion cell.

In an example implementation, the input data comprise time series history data relating to one or more parameters or metrics associates with the lithium-ion cell, one or more parameters or metrics comprising at least one of voltage, current, and temperature.

In an example implementation, the method further comprises obtaining or generating at least a portion of the input data based on a predefined measurement sequence, including but not limited to: current pulse, open circuit voltage measurement, reference performance test, hybrid pulse power characterization test, and direct current internal resistance measurement.

In an example implementation, the predefined measurement sequence comprises current pulse, open circuit voltage measurement, reference performance test, hybrid pulse power characterization test, and direct current internal resistance (DCIR) measurement.

In an example implementation, the method further comprises training the enhanced state-of-health (SOH) model using one or more machine learning (ML) algorithms.

In an example implementation, the one or more machine learning (ML) algorithms comprise at least one of linear regression, logistic regression, nonlinear regression, decision tree ensemble methods, neural networks, recurrent neural networks, long-short-term memory networks, Gaussian process algorithms, Bayesian algorithms, support vector regression, K-nearest-neighbors regression, and graph neutral networks.

In an example implementation, the method further comprises training the enhanced state-of-health (SOH) model using training data.

In an example implementation, the method further comprises generating the training data by operating one or more cells using randomized voltage, current, and temperature profiles.

In an example implementation, the method further comprises generating the training data by operating one or more cells using a standardized drive-cycle test, or a similar test that replicates operation of a cell in an actual use case, such as the Federal Urban Driving Schedule (FUDS) test.

An example system, in accordance with the present disclosure, comprises: a lithium-ion cell; and one or more circuits for managing operation of the lithium-ion cell, wherein the one or more circuits are configured to assess state-of-health (SOH) of the lithium-ion cell. The assessing may comprise calculating the state-of-health (SOH) using an enhanced state-of-health (SOH) model, and the enhanced state-of-health (SOH) model uses input data other than data provided directly by the lithium-ion cell, the input data comprises at least data acquired during operation of the lithium-ion cell and/or data acquired during manufacturing and initialization of the lithium-ion cell or electrodes of the lithium-ion cell.

In an example implementation, the lithium-ion cell comprises a silicon-dominant cell comprising a silicon-dominant anode with silicon >50% of active material of the anode, and the enhanced state-of-health (SOH) model is configured based on one or more characteristics unique to silicon-dominant cells.

In an example implementation, the enhanced state-of-health (SOH) model is configured for use regardless of an operation mode of the lithium-ion cell.

In an example implementation, the input data comprises time series history data relating to one or more parameters or metrics associates with the lithium-ion cell, one or more parameters or metrics comprising at least one of voltage, current, and temperature.

In an example implementation, the one or more circuits are configured to obtain or generate at least a portion of the input data based on a predefined measurement sequence, including but not limited to: current pulse, open circuit voltage measurement, reference performance test, hybrid pulse power characterization test, and direct current internal resistance measurement.

In an example implementation, the predefined measurement sequence comprises current pulse, open circuit voltage measurement, reference performance test, hybrid pulse power characterization test, and direct current internal resistance (DCIR) measurement.

In an example implementation, the one or more circuits are configured to train the enhanced state-of-health (SOH) model using one or more machine learning (ML) algorithms.

In an example implementation, the one or more machine learning (ML) algorithms comprise at least one of linear regression, logistic regression, nonlinear regression, decision tree ensemble methods, neural networks, recurrent neural networks, long-short-term memory networks, Gaussian process algorithms, Bayesian algorithms, support vector regression, K-nearest-neighbors regression, and graph neutral networks.

In an example implementation, the one or more circuits are configured to train the enhanced state-of-health (SOH) model using training data.

In an example implementation, the one or more circuits are configured to generate the training data by operating one or more cells using randomized voltage, current, and temperature profiles.

In an example implementation, the one or more circuits are configured to generate the training data by operating one or more cells using a standardized drive-cycle test, or a similar test that replicates operation of a cell in an actual use case, such as the Federal Urban Driving Schedule (FUDS) test.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for managing a lithium-ion cell, the method comprising:
assessing state-of-health (SOH) of the lithium-ion cell, wherein:
the assessing comprises calculating the state-of-health (SOH) using an enhanced state-of-health (SOH) model, and
the enhanced state-of-health (SOH) model uses input data, wherein at least a portion of the input data is obtained from sources other than the lithium-ion cell, and wherein the input data comprises data acquired during operation of the lithium-ion cell and/or data acquired during manufacturing and initialization of the lithium-ion cell or electrodes of the lithium-ion cell; and
training the enhanced state-of-health (SOH) model using training data that is adaptively configured based on the lithium-ion cell.

2. The method of claim 1, wherein the lithium-ion cell comprises a silicon-dominant cell comprising a silicon-dominant anode with silicon >50% of active material of the anode, and wherein the enhanced state-of-health (SOH) model is configured based on one or more characteristics unique to silicon-dominant cells.

3. The method of claim 1, wherein the enhanced state-of-health (SOH) model is configured for use regardless of an operation mode of the lithium-ion cell.

4. The method of claim 1, wherein the input data comprise time series history data relating to one or more parameters or metrics associates with the lithium-ion cell, the one or more parameters or metrics comprising one or more of voltage, current, and temperature.

5. The method of claim 1, further comprising obtaining or generating at least a portion of the input data based on a predefined measurement sequence, including but not limited to: current pulse, open circuit voltage measurement, reference performance test, hybrid pulse power characterization test, and direct current internal resistance measurement.

6. The method of claim 5, wherein the predefined measurement sequence comprises current pulse, open circuit voltage measurement, reference performance test, hybrid pulse power characterization test, and direct current internal resistance (DCIR) measurement.

7. The method of claim 1, further comprising training the enhanced state-of-health (SOH) model using one or more machine learning (ML) algorithms.

8. The method of claim 7, wherein the one or more machine learning (ML) algorithms comprise one or more of linear regression, logistic regression, nonlinear regression, decision tree ensemble methods, neural networks, recurrent neural networks, long-short-term memory networks, Gaussian process algorithms, Bayesian algorithms, support vector regression, K-nearest-neighbors regression, and graph neutral networks.

9. The method of claim 1, further comprising generating the training data by operating one or more cells using randomized voltage, current, and temperature profiles.

10. The method of claim 1, further comprising generating the training data by operating one or more cells using a standardized drive-cycle test, or a similar test that replicates operation of a cell in an actual use case.

11. A system comprising:
a lithium-ion cell; and
one or more circuits for managing operation of the lithium-ion cell, wherein the one or more circuits are configured to:
assess state-of-health (SOH) of the lithium-ion cell, wherein:
the assessing comprises calculating the state-of-health (SOH) using an enhanced state-of-health (SOH) model, and
the enhanced state-of-health (SOH) model uses input data, wherein at least a portion of the input data is obtained from sources other than the lithium-ion cell, and wherein the input data comprises data acquired during operation of the lithium-ion cell and/or data acquired during manufacturing and initialization of the lithium-ion cell or electrodes of the lithium-ion cell; and
train the enhanced state-of-health (SOH) model using training data that is adaptively configured based on the lithium-ion cell.

12. The system of claim 11, wherein the lithium-ion cell comprises a silicon-dominant cell comprising a silicon-dominant anode with silicon >50% of active material of the anode, and wherein the enhanced state-of-health (SOH) model is configured based on one or more characteristics unique to silicon-dominant cells.

13. The system of claim 11, wherein the enhanced state-of-health (SOH) model is configured for use regardless of an operation mode of the lithium-ion cell.

14. The system of claim 11, wherein the input data comprises time series history data relating to one or more parameters or metrics associates with the lithium-ion cell, the one or more parameters or metrics comprising one or more of voltage, current, and temperature.

15. The system of claim 11, wherein the one or more circuits are configured to obtain or generate at least a portion of the input data based on a predefined measurement sequence, including but not limited to: current pulse, open circuit voltage measurement, reference performance test, hybrid pulse power characterization test, and direct current internal resistance measurement.

16. The system of claim 15, wherein the predefined measurement sequence comprises current pulse, open circuit voltage measurement, reference performance test, hybrid pulse power characterization test, and direct current internal resistance (DCIR) measurement.

17. The system of claim 11, wherein the one or more circuits are configured to train the enhanced state-of-health (SOH) model using one or more machine learning (ML) algorithms.

18. The system of claim 17, wherein the one or more machine learning (ML) algorithms comprise one or more of linear regression, logistic regression, nonlinear regression, decision tree ensemble methods, neural networks, recurrent neural networks, long-short-term memory networks, Gaussian process algorithms, Bayesian algorithms, support vector regression, K-nearest-neighbors regression, and graph neutral networks.

19. The system of claim 11, wherein the one or more circuits are configured to generate the training data by operating one or more cells using randomized voltage, current, and temperature profiles.

20. The system of claim 11, wherein the one or more circuits are configured to generate the training data by operating one or more cells using a standardized drive-cycle test, or a similar test that replicates operation of a cell in an actual use case.

* * * * *